(12) United States Patent
Klemt et al.

(10) Patent No.: US 12,516,742 B2
(45) Date of Patent: Jan. 6, 2026

(54) VALVE DIAPHRAGM WITH TRANSPONDER, AND METHOD OF PRODUCTION

(71) Applicant: GEMÜ Gebr. Müller Apparatebau GmbH & Co. Kommanditgesellschaft, Ingelfingen (DE)

(72) Inventors: Michael Klemt, Pfedelbach (DE); Thomas Esslinger, Pfedelbach (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 48 days.

(21) Appl. No.: 18/283,100

(22) PCT Filed: Apr. 25, 2022

(86) PCT No.: PCT/EP2022/060908
§ 371 (c)(1),
(2) Date: Sep. 20, 2023

(87) PCT Pub. No.: WO2022/233627
PCT Pub. Date: Nov. 10, 2022

(65) Prior Publication Data
US 2024/0167580 A1    May 23, 2024

(30) Foreign Application Priority Data
May 5, 2021    (DE) .......................... 102021111603.1

(51) Int. Cl.
*F16K 7/14*    (2006.01)
(52) U.S. Cl.
CPC ..................................... *F16K 7/14* (2013.01)

(58) Field of Classification Search
CPC ............ F16K 7/12; F16K 7/14; F16K 37/0041
See application file for complete search history.

(56) References Cited

U.S. PATENT DOCUMENTS

| 7,685,752 B2* | 3/2010 | Robadey ............... A01K 11/001 |
| | | 343/788 |
| 2002/0060629 A1 | 5/2002 | Pfeiffer et al. |
| (Continued) | | |

FOREIGN PATENT DOCUMENTS

| DE | 10055060 A1 | 5/2002 |
| DE | 202018105892 U1 | 11/2018 |
| (Continued) | | |

OTHER PUBLICATIONS

Machine English translation of DE-202018105500-U1 (Year: 2025).*
(Continued)

*Primary Examiner* — Hailey K. Do
(74) *Attorney, Agent, or Firm* — Harness, Dickey & Pierce, P.L.C.

(57) ABSTRACT

A valve diaphragm is provided, comprising: an edge region arranged at a narrow side, in particular a tab protruding beyond a functional region of the valve diaphragm, wherein a recess of the edge region comprises, starting from an opening of the recess, a diameter enlargement; and a plastic body which comprises a transponder and whose fastening portion protrudes through the opening, wherein, by means of a shaping process effected in the diameter enlargement of the recess, in particular by hot caulking, at least one region of the fastening portion at least partially fills the diameter enlargement.

18 Claims, 6 Drawing Sheets

(56) References Cited

U.S. PATENT DOCUMENTS

| | | | |
|---|---|---|---|
| 2016/0162771 | A1 | 6/2016 | Mueller et al. |
| 2019/0162317 | A1 | 5/2019 | Binz et al. |
| 2019/0346063 | A1 | 11/2019 | Lebonte et al. |
| 2021/0010613 | A1 * | 1/2021 | Trenkamp ........... F16K 27/0236 |

FOREIGN PATENT DOCUMENTS

| | | | |
|---|---|---|---|
| DE | 202018105500 U1 * | 1/2019 | |
| DE | 102017128229 A1 | 5/2019 | |
| DE | 102018111383 A1 | 11/2019 | |
| EP | 2977624 A1 | 1/2016 | |
| EP | 2024764 B1 | 7/2019 | |
| EP | 3851714 A1 * | 7/2021 | ......... F16K 37/0041 |
| FR | 2844813 A1 | 3/2004 | |

OTHER PUBLICATIONS

Machine English translation of EP-3851714-A1 (Year: 2025).*
International Search Report from corresponding PCT Application No. PCT/EP2022/060908, Dated Oct. 20, 2022.
Written Opinion from corresponding PCT Application No. PCT/EP2022/060908, Dated Oct. 20, 2022.
German Search Report from corresponding German Priority Application No. 10 2021 111 603.1, Dated Mar. 16, 2022.

* cited by examiner

VALVE DIAPHRAGM WITH TRANSPONDER, AND METHOD OF PRODUCTION

CROSS-REFERENCE TO RELATED APPLICATIONS

This application is a national phase application of PCT Application No. PCT/EP2022/060908, filed on 25 Apr. 2022, which claims the benefit of and priority to German Patent Application No. 10 2021 111 603.1, filed on 5 May 2021. The entire disclosures of the applications identified in this paragraph are incorporated herein by references.

The invention relates to valve diaphragms and a method of producing them.

BACKGROUND

Valve diaphragms are commonly known and are used to close and open process fluid lines in a valve body.

For identification purposes, connecting an RFID chip in the sense of a transponder to the diaphragm is known.

The problems of the prior art are solved by valve diaphragms according to claim 1 and a subsidiary claim, and by a method of production of a dependent claim. Advantageous developments can be found in the dependent claims, the following description and the drawing.

According to a first aspect of the description, a valve diaphragm is made available which comprises: an edge region arranged at a narrow side, in particular a tab protruding beyond a functional region of the valve diaphragm, wherein a recess of the edge region comprises, starting from an opening of the recess, a diameter enlargement; and a plastic body which comprises a transponder and whose fastening portion protrudes through the opening, wherein, by means of a shaping process effected in the diameter enlargement of the recess, in particular by hot caulking, at least one region of the fastening portion at least partially fills the diameter enlargement.

In particular in the case of thin-walled valve diaphragms or valve diaphragms whose material, such as PTFE, and whose material properties restrict fastening options, it is only possible to attach a transponder to the valve diaphragm.

An advantageous example is characterized in that the recess is a passage running in particular perpendicularly to a diaphragm plane and having a further opening, and wherein the plastic body does not substantially protrude beyond the further opening or the plastic body closes off within the further opening.

Advantageously, for example, a further diaphragm such as an EPDM diaphragm can be arranged on the side on which the further opening is located.

An advantageous example is characterized in that the recess is a passage running in particular perpendicularly to the plane of the diaphragm and has a further opening, and wherein a surface of the edge region of the valve diaphragm surrounding the further opening and a surface of the plastic body are substantially flush.

In addition to improved arrangement options, the flush design also improves cleanability. Consequently, the valve diaphragm is suitable for high hygiene requirements.

An advantageous example is characterized in that a head of the plastic body arranged outside the recess comprises an abutment portion facing the diameter enlargement, which abuts against an abutment surface of the edge region.

The head protruding on one side of the valve diaphragm enables positive locking to secure the plastic body to the valve diaphragm.

An advantageous example is characterized in that the abutment portion of the head and the region of the fastening portion at least partially filling the diameter enlargement secure in a positive-locking manner the plastic body to the edge region.

The positive locking is particularly advantageous for valve diaphragm materials such as PTFE.

An advantageous example is characterized in that the head comprises, in particular embeds, the transponder.

Advantageously, the transponder arranged outside the recess is easier to read. The functional decoupling of the holding of the transponder from the fastening enables constructive degrees of freedom. In particular, the arrangement of thin-walled valve diaphragms is designed to be simpler.

An advantageous example is characterized in that the abutment surface of the edge region is recessed with respect to a surrounding surface of the edge region.

Advantageously, the outer contour of the head can be received in this way.

An advantageous example is characterized in that a narrow-side outer contour of the head follows an imaginary cylinder surface at least in the proximal direction.

Advantageously, there are manufacturing advantages since the rotational alignment of the head is not decisive during production and connection to the edge region.

An advantageous example is characterized in that a main body of the valve diaphragm is made of a polyolefin, such as polytetrafluoroethylene or polyvinylidene fluoride.

An advantageous example is characterized in that the plastic body, in particular its main body, is made of polyamide, polybutylene terephthalate, polycarbonate, polyether ketone, polyoxymethylene, or polypropylene.

A second aspect of the description relates to a method of production of the valve diaphragm according to the first aspect. The method comprises: producing the main body of the valve diaphragm, wherein the diameter enlargement is implemented as a blind hole with an inner diameter in the main body which decreases at least in portions towards the bottom of the blind hole; penetrating, in particular punching, a passage in the region of the diameter enlargement to form the recess; arranging the one blank fastening portion of a plastic body blank in the region of the diameter enlargement, wherein the fastening portion is guided through the opening; and shaping, in particular hot caulking, the blank fastening portion to produce the at least one region of the fastening portion.

A third aspect of the description relates to a valve diaphragm. This comprises: an edge region arranged at a narrow side, in particular a tab protruding beyond a functional region of the valve diaphragm; and a plastic body comprising a head with a transponder arranged therein, wherein a fastening portion arranged within the edge region projects from the head, and wherein the fastening portion comprises: at least two first positive-locking portions arranged on opposite sides of a central longitudinal axis of the plastic body and tapering in the distal direction; and at least two second positive-locking portions arranged on opposite sides of the central longitudinal axis of the plastic body and projecting in the proximal direction.

This combines differently shaped positive-locking portions which improve the pull-out strength of the plastic body in combination with one another. The first positive-locking portions ensure the opening of a cavity upon penetration. The second positive-locking portions increased the pull-out strength.

An advantageous example is characterized in that surfaces oriented in the distal direction of the first positive-locking portions each enclose a smaller angle, in particular an angle smaller by at least 10°, in particular an angle smaller by at least 15°, with the central longitudinal axis than surfaces oriented in the distal direction of the second positive-locking portions enclose with the central longitudinal axis.

Advantageously, the resistance to penetration is reduced in the region of the first positive-locking portions. Thus, the second positive-locking portions increase the pull-out resistance.

An advantageous example is characterized in that a surface of the distal end of the fastening portion forms an edge in the transition to the respective first positive-locking portions, and/or wherein the surface of the distal end of the fastening portion does not form an edge in the transition to the respective second positive-locking portions.

The edges improve the opening of the elastomer material to produce a cavity which enables the penetration of the plastic body.

An advantageous example is characterized in that a surface oriented in the distal direction of the respective first positive-locking portion is followed by a surface oriented in the direction of the head, and wherein a surface oriented in the distal direction of the respective second positive-locking portion is followed by a surface oriented in the lateral direction.

The surfaces oriented in the direction of the head provide the pull-out counterforce. On the one hand, the surface oriented in the lateral direction enables the plastic body to slide into the elastomer. On the other hand, an edge is provided between the lateral surface and the proximal surface oriented in the direction of the head.

An advantageous example is characterized in that a main body of the valve diaphragm comprising the edge region is made of an elastomer such as ethylene-propylene-diene rubber.

Figure 1:
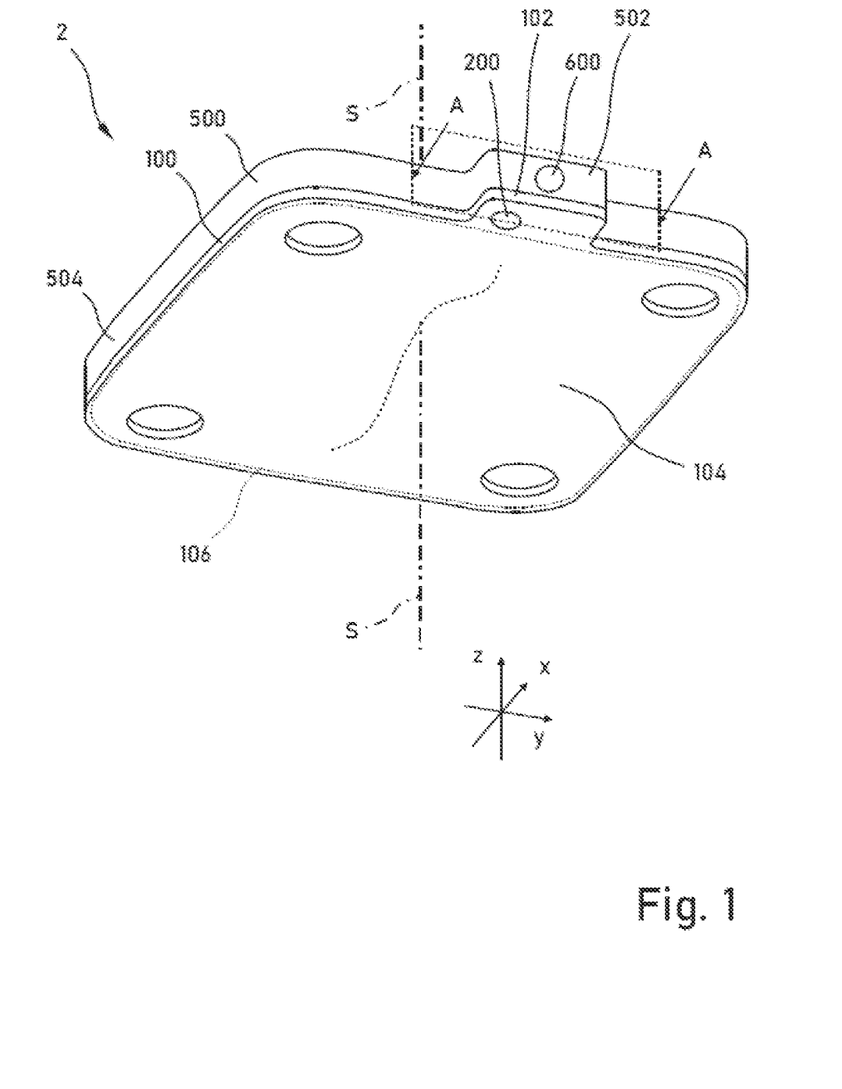
FIG. 1 shows a schematic perspective view of a multi-part diaphragm.

FIG. 1 shows a schematic perspective view of a multi-part diaphragm 2 comprising a wet-side diaphragm 100 and a diaphragm 500 arranged on the dry side. The two-part diaphragm 2 therefore comprises the first diaphragm 100 facing a valve body of a diaphragm valve and the second diaphragm 500 facing a drive of the diaphragm valve. The two-part diaphragm 2 is clamped in a lateral region—the clamping region—between the valve body and the drive. The first diaphragm 100 can also be referred to as a diaphragm shield. The first diaphragm 100 comprises, for example, a synthetic fluoropolymer such as polytetrafluoroethylene. The first diaphragm 100 comprises a sealing web, wherein the sealing web of the first diaphragm 100 is moved along an actuation axis S and presses onto the valve seat to close off the fluid channel. Of course, the sealing web can also be omitted in other embodiments. Four outer through-holes are used to pass through fastening devices such as stud bolts for clamping the diaphragm 2, but these may be omitted in other embodiments.

Figure 2:
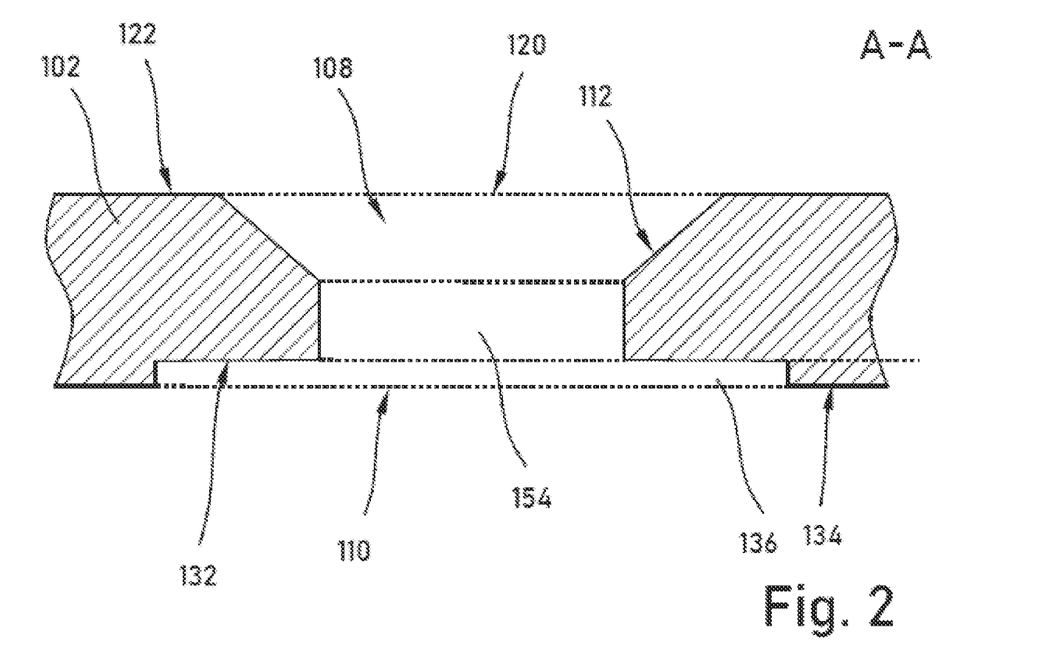
FIG. 2 shows an edge region of a diaphragm comprising a passage in a schematic section from FIG. 1.
Figure 3:
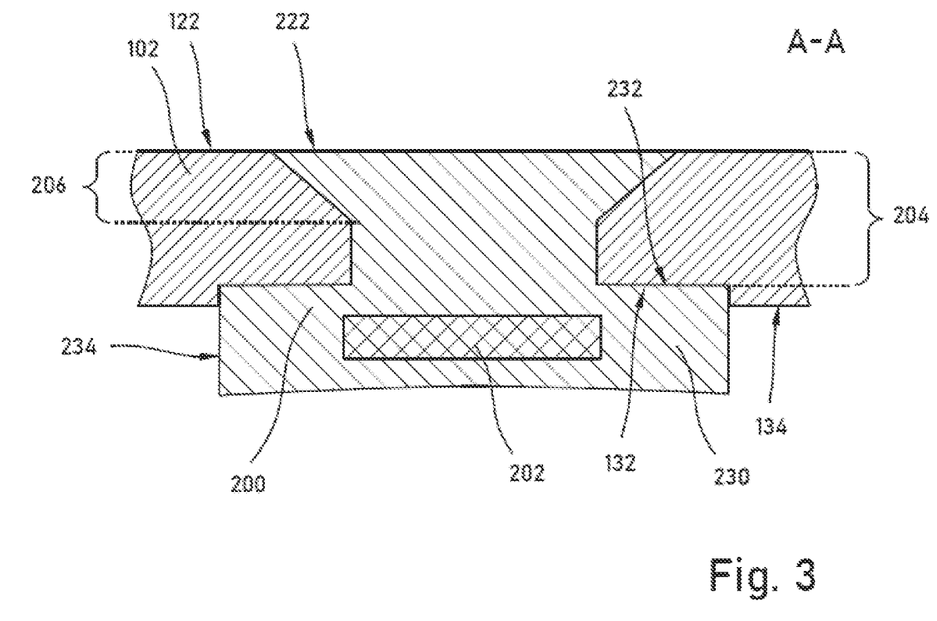
FIG. 3 shows aplastic body arranged in the passage in a schematic section from FIG. 1.
Figure 4:
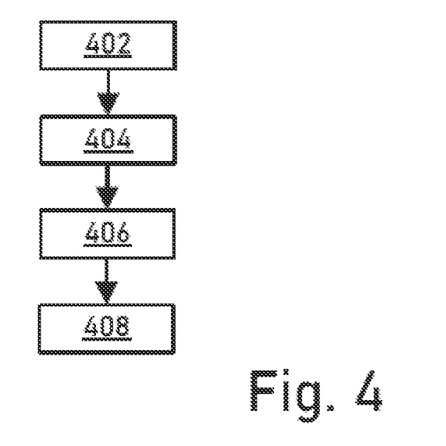
FIG. 4 shows a schematic flow chart.

The following description relates to diaphragm 100 and refers to FIGS. 2 through 4.

The valve diaphragm 100 comprises an edge region 102 arranged at a narrow side of a main body 104, in particular a tab protruding beyond a functional region 106 of the valve diaphragm 100. For example, the functional region 106 comprises a flexing region that enables the closing off and opening of the diaphragm, and a clamping region for laterally clamping the diaphragm. A recess 108 of the edge region 102 starting from an opening 110 of the recess 108 comprises a diameter enlargement 112.

A substantially one-piece plastic body 200 comprises a fastening portion 204 that protrudes through the opening 110 in the installed state. A transponder 202 is arranged in a head 230 of the plastic body 200.

The fastening portion 204 is formed by means of a shaping process, effected in the diameter enlargement 112 of the recess 108, in particular by hot caulking. For this purpose, at least one region 206 of the fastening portion 204 is shaped. The diameter enlargement 112 is at least partially filled by the fastening portion 204 or the region 206 thereof.

The transponder 202 stores, for example, an electronic identifier of the valve diaphragm 100, which can be read by a reading device without contact.

The recess 108 is a passage running in particular perpendicularly to a diaphragm plane xy and has a further opening 120. The plastic body 200 does not protrude substantially beyond the further opening 120, or the plastic body 200 closes off within the further opening 120. In one example, the surface 122 of the edge region 102 of the valve diaphragm 100 surrounding the further opening 120 and a surface 222 of the plastic body 200 are substantially flush.

The head 230 of the plastic body 200, which is arranged outside the recess 108, comprises an abutment portion 232 facing the diameter enlargement 112, which abutment portion abuts an abutment surface 132 of the edge region 132. Thus, the head 230 comprises the transponder 202 and embeds it in the plastic material.

The abutment portion 232 of the head 230 and the region 206 of the fastening portion 204 at least partially filling the diameter enlargement 112 secure in a positive-locking manner the plastic body 200 to the edge region 102.

The annular abutment surface 132 recedes with respect to a surface 134 of the edge region 102 surrounding the head 230, thereby forming a receiving region 136 for a proximal part of the head 230. Through the recessed abutment surface 132, the head 230 is secured in a positive-locking manner in or parallel to the diaphragm plane xy. A connecting passage 154 connects the receiving region 136 and the diameter enlargement 112.

A narrow-side outer contour 234 of the head 230 follows an imaginary cylindrical surface at least in the proximal direction.

The main body 104 of the valve diaphragm 100, which may also be referred to as a shield or diaphragm shield, for example, is made of a polytetrafluoroethylene or polyvinylidene fluoride. The plastic body 200, in particular its main body, is made of polyamide, polybutylene terephthalate, polycarbonate, polyether ketone, polyoxymethylene or polypropylene.

As an alternative to the example shown in FIGS. 2 to 4, the recess runs parallel to the plane of the diaphragm, for example, and the opening is located on a narrow side. In this example, which is not shown, the head 230 of the plastic body 200 is located on the narrow side of the diaphragm 100 or edge region 102. Thus, the recess does not have an opening opposite the opening 110 and is designed, for example, in the manner of a blind hole. In this example, the longitudinal axis of the recess is parallel to the diaphragm plane xy, for example.

To produce the valve diaphragm 100, the following steps are performed. A production 402 of the main body 104 of the valve diaphragm 100 comprises implementing the diameter enlargement 112 as a blind hole with the inner diameter in the main body 104 decreasing at least in portions towards the bottom of the blind hole. A penetration 404, in particular a punching, of the passage 154 is performed in the region of the diameter enlargement 112 to form the recess 108. An arrangement 406 of a blank fastening portion 690 of a plastic body blank 600 in the region of the diameter enlargement 112 comprises passing the fastening portion 602 through the opening 110. A shaping 408, in particular a hot caulking, of the blank fastening portion 602 is performed in order to secure the at least one region 206 of the fastening portion 204 in the diameter enlargement 112.

Figure 5:
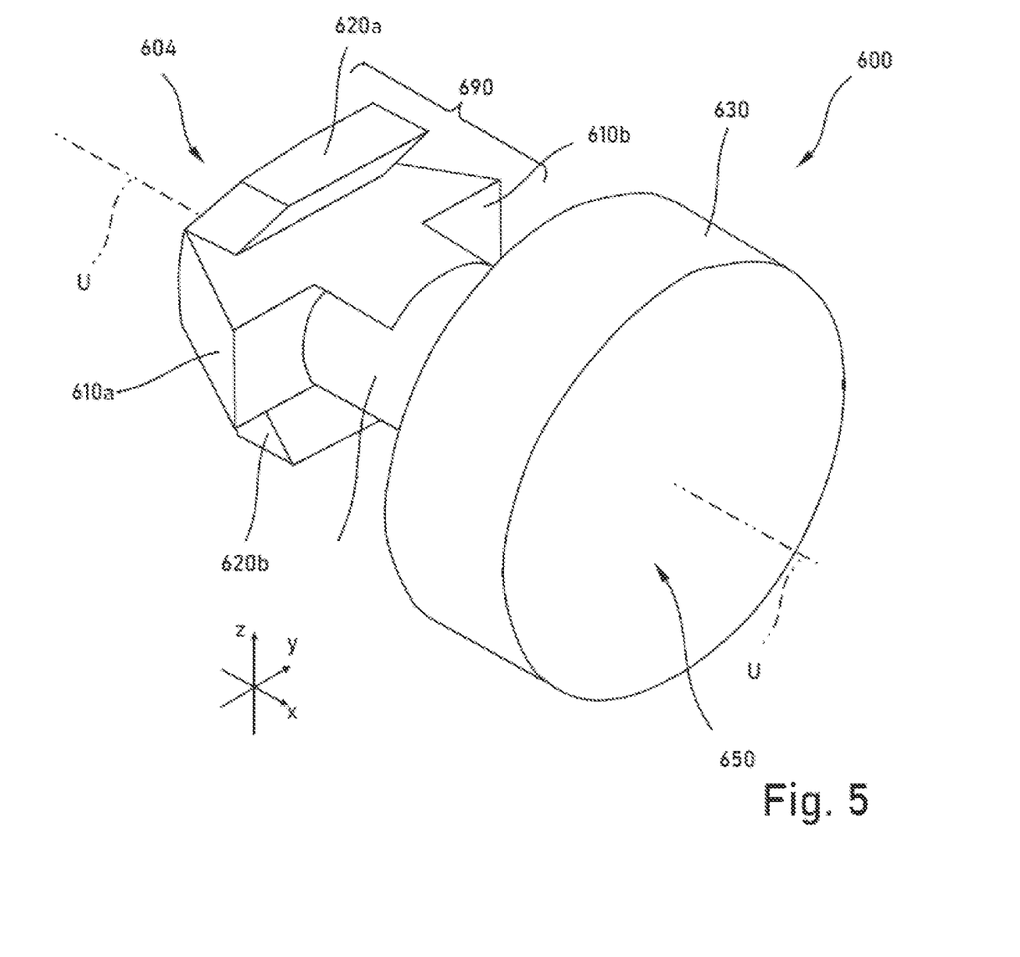
FIG. 5 shows a further plastic body in schematic perspective view.

In step 404, the plastic body 600 of FIG. 5 is used. The diameter enlargement 112 is matched in volume to the blank fastening portion 690 of FIG. 5, such that no material protrudes beyond the opening 120 of FIG. 2 after hot caulking.

The following description relates to the diaphragm 500 of FIG. 1 and refers to FIGS. 1 and 5 to 7.

Figure 6:
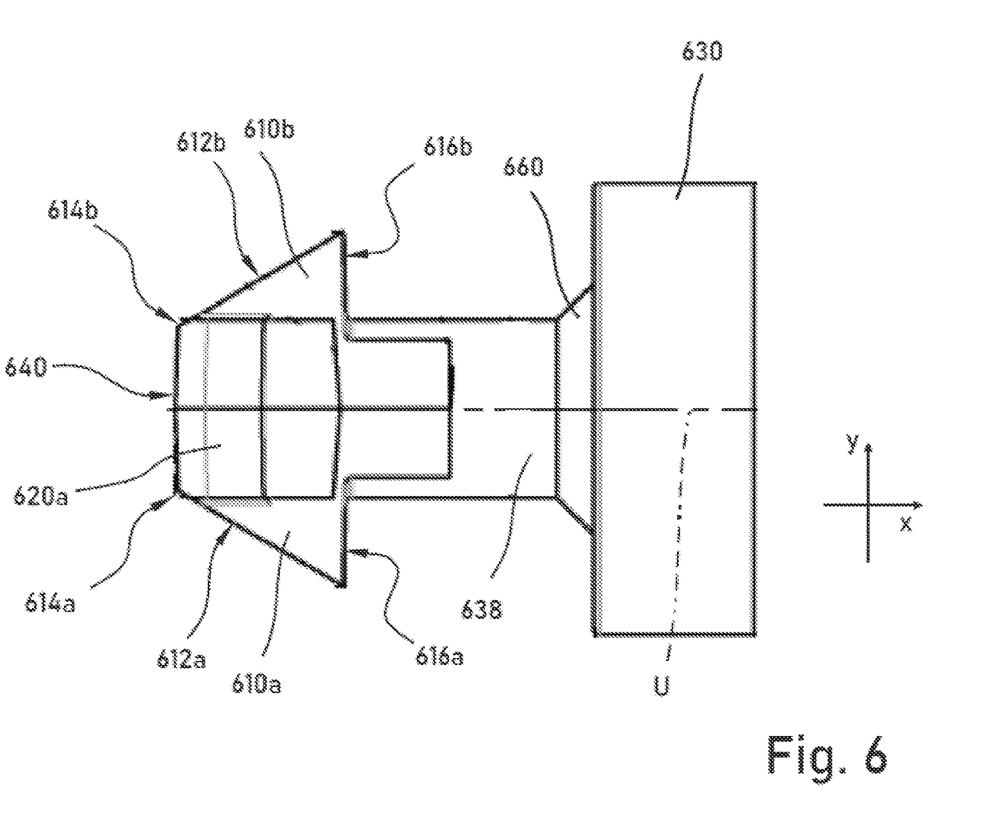
FIG. 6 shows the further plastic body in a side view.
Figure 7:
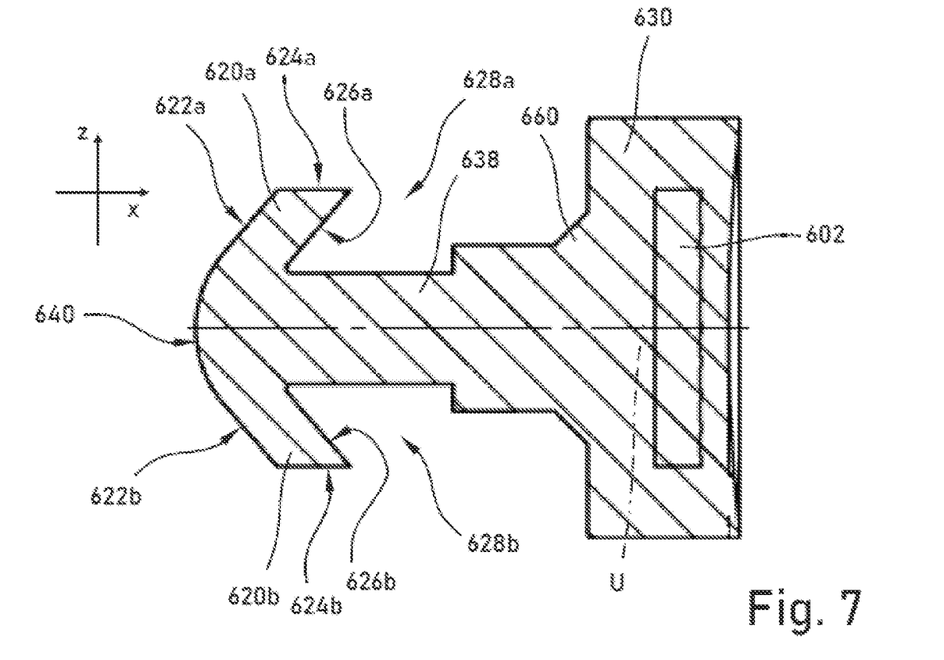
FIG. 7 shows the further plastic body in a schematic section.

The valve diaphragm 500 comprises an edge region 502 arranged at a narrow side of a main body 504, in particular a tab protruding beyond a functional region of the valve diaphragm 500. A plastic body 600 comprises a head 630 with a transponder 602 arranged therein. A fastening portion 604 arranged within the edge region 502 protrudes from the head 630. A distal surface 650 of the head 630 is concavely curved.

In an example not shown, the tabs are arranged in a manner offset from one another by an angle of, for example, 180° according to the edge regions 102, 502.

The fastening portion 604 comprises at least two first positive-locking portions 610a, 610b arranged on opposite sides of a central longitudinal axis U of the plastic body 600 and tapering in the distal direction. Further, the fastening portion comprises at least two second positive-locking portions 620a, 620b arranged on opposite sides of the central longitudinal axis U of the plastic body 600 and projecting in the proximal direction.

A surface 612a, 612b of the respective first positive-locking portions 610a, 610b encloses an angle with the central longitudinal axis U in a range between 20° and 40°, in particular between 25° and 35°.

The second positive-locking portions 620a, 620b project obliquely from the distal end of the fastening portion 604 and their respective distally arranged surfaces 622a, 622b enclose an angle with the central longitudinal axis in a range between 40° and 60°, in particular between 45° and 55°.

The surfaces oriented in the distal direction 612a, 612b of the first positive-locking portions 610a, 610b each enclose a smaller angle, in particular an angle smaller by at least 10°, in particular an angle smaller by at least 15°, with the central longitudinal axis U than surfaces oriented in the distal direction 622a, 622b of the second positive-locking portions 620a, 620b with the central longitudinal axis U.

A surface 640 of the distal end of the fastening portion 604 in the transition to the respective first positive-locking portions 610a, 610b forms an edge 614a, 614b. In an xy section, the distal surface 640 runs substantially or nearly perpendicular to the central longitudinal axis U and has only a small convex curvature.

The surface 640 of the distal end of the fastening portion 604 does not form an edge in the transition to the respective second positive-locking portions 620a, 620b, but rather transitions homogeneously. In an xz plane, the distal surface 640 is convexly curved.

A surface 612a, 612b oriented in the distal direction of the respective first positive-locking portions 610a, 610b is adjoined via an edge by a surface 616a, 616b oriented in the direction of the head 630. A surface oriented in the distal direction 622a, 622b of the respective second positive-locking portions 620a, 620b is adjoined via an edge by a surface 624a, 624b oriented in the lateral direction. The lateral surface 624a, 624b is adjoined via an edge by a respective surface 626a, 626b oriented in the direction of the head 630, which surface 626a, 626b runs parallel to the opposite surfaces 622a, 622b, for example, and together with a web portion 638 of the fastening portion opens up a space into which elastomer material of the edge region can penetrate.

A frustoconical portion 660 tapers in the proximal direction and connects the web portion 638 and the cylindrical head 630. The portion 660 improves the connection of the head to the fastening portion.

A main body 504 of the valve diaphragm 500, which comprises the edge region, is made of an elastomer such as ethylene-propylene-diene rubber.

What is claimed is:

1. A method of production of a valve diaphragm, wherein the valve diaphragm comprises: an edge region arranged at a narrow side, wherein a recess of the edge region comprises, starting from an opening of the recess, a diameter enlargement; and a plastic body which comprises a transponder and whose fastening portion protrudes through the opening, wherein at least one region of the fastening portion at least partially fills the diameter enlargement by means of hot caulking executed in the diameter enlargement of the recess, and wherein the at least one region of the fastening portion secures the plastic body in a positive-locking manner to the edge region, wherein the method comprises:
producing a main body of the valve diaphragm, wherein the diameter enlargement is implemented as a blind hole with an inner diameter in the main body which decreases at least in portions towards the bottom of the blind hole;
penetrating a passage in a region of the diameter enlargement to form the recess;
arranging a blank fastening portion of a plastic body blank in the region of the diameter enlargement, wherein the fastening portion is guided through the opening; and
shaping the blank fastening portion to produce the at least one region of the fastening portion in the diameter enlargement.

2. A valve diaphragm comprising:
an edge region arranged at a narrow side; and
a plastic body comprising a head with a transponder arranged therein, wherein a fastening portion arranged within the edge region projects from the head, and wherein the fastening portion comprises:
at least two first positive-locking portions arranged on opposite sides of a central longitudinal axis (U) of the plastic body and tapering in a distal direction; and
at least two second positive-locking portions arranged on opposite sides of the central longitudinal axis (U) of the plastic body and projecting in a proximal direction, wherein surfaces oriented in the distal direction of the first positive-locking portions each enclose a smaller angle with the central longitudinal axis (U) than surfaces oriented in the distal direction of the second positive-locking portions enclose with the central longitudinal axis (U).

3. The valve diaphragm according to claim 2, wherein a surface of a distal end of the fastening portion forms an edge in a transition to the respective first positive-locking portions, and/or wherein the surface of the distal end of the fastening portion does not form an edge in the transition to the respective second positive-locking portions.

4. The valve diaphragm according to claim 2, wherein a surface oriented in the distal direction of the respective first positive-locking portions is followed by a surface oriented in a direction of the head, and wherein a surface oriented in a distal direction of the respective second positive-locking portions is followed by a surface oriented in a lateral direction.

5. The valve diaphragm according to claim 2, wherein a main body of the valve diaphragm comprising the edge region is made of an elastomer comprising ethylene-propylene-diene rubber.

6. A valve diaphragm comprising:
   an edge region arranged at a narrow side, wherein a recess of the edge region comprises, starting from an opening of the recess, a diameter enlargement; and
   a plastic body which comprises a transponder and whose fastening portion protrudes through the opening, wherein at least one region of the fastening portion at least partially fills the diameter enlargement by means of hot caulking executed in the diameter enlargement of the recess, and wherein the at least one region of the fastening portion secures the plastic body in a positive-locking manner to the edge region.

7. The valve diaphragm according to claim 6, wherein the recess is a passage running through the valve diaphragm and having a further opening, and wherein the plastic body does not protrude beyond the further opening or the plastic body closes off within the further opening.

8. The valve diaphragm according to claim 6, wherein the recess is a passage running through the valve diaphragm and has a further opening, and wherein a surface of the edge region of the valve diaphragm surrounding the further opening and a surface of the plastic body are flush.

9. The valve diaphragm according to claim 6, wherein a narrow-side outer contour of a head of the plastic body follows an imaginary cylinder surface at least in a proximal direction and at least in portions.

10. The valve diaphragm according to claim 6, wherein a main body of the valve diaphragm is made of polytetrafluoroethylene or polyvinylidene fluoride.

11. The valve diaphragm according to claim 6, wherein the plastic body is made of polyamide, polybutylene terephthalate, polycarbonate, polyether ketone, polyoxymethylene or polypropylene.

12. The valve diaphragm according to claim 6, wherein the edge region is a tab protruding beyond a functional region of the valve diaphragm.

13. The valve diaphragm according to claim 6, wherein the recess is a passage running perpendicular to a plane (xy) of the valve diaphragm.

14. The valve diaphragm according to claim 6, wherein a head of the plastic body arranged outside the recess comprises an abutment portion facing the diameter enlargement, which abuts against an abutment surface of the edge region.

15. The valve diaphragm according to claim 14, wherein the head embeds the transponder.

16. The valve diaphragm according to claim 6, wherein an abutment portion of a head of the plastic body and the at least one region of the fastening portion at least partially filling the diameter enlargement secure in a positive-locking manner the plastic body to the edge region.

17. The valve diaphragm according to claim 14, wherein the head comprises the transponder.

18. The valve diaphragm according to claim 14, wherein the abutment surface of the edge region is recessed with respect to a surrounding surface of the edge region.

\* \* \* \* \*